United States Patent
Volponi et al.

(10) Patent No.: US 9,818,242 B2
(45) Date of Patent: Nov. 14, 2017

(54) GAS TURBINE ENGINE ANOMALY DETECTIONS AND FAULT IDENTIFICATIONS

(71) Applicants: University of Southern California, Los Angeles, CA (US); INHA University, Incheon (KR)

(72) Inventors: Allan J. Volponi, West Simsbury, CT (US); Andrew F. Geib, Glastonbury, CT (US); Martin Gawecki, Los Angeles, CA (US); Chung Chieh Kuo, Arcadia, CA (US); Wonik Choi, Incheon (KR)

(73) Assignees: UNIVERSITY OF SOUTHERN CALIFORNIA, Los Angeles, CA (US); INHA UNIVERSITY, Incheon (KR)

( * ) Notice: Subject to any disclaimer, the term of this patent is extended or adjusted under 35 U.S.C. 154(b) by 0 days.

(21) Appl. No.: 14/934,509

(22) Filed: Nov. 6, 2015

(65) Prior Publication Data

US 2016/0171796 A1 Jun. 16, 2016

Related U.S. Application Data

(60) Provisional application No. 62/092,647, filed on Dec. 16, 2014.

(51) Int. Cl.
*G07C 5/08* (2006.01)
*G06F 17/30* (2006.01)
(Continued)

(52) U.S. Cl.
CPC ....... *G07C 5/0808* (2013.01); *G05B 23/0254* (2013.01); *G05B 23/0281* (2013.01);
(Continued)

(58) Field of Classification Search
CPC .... G01M 15/14; G05B 23/02; G05B 23/0275
See application file for complete search history.

(56) References Cited

U.S. PATENT DOCUMENTS

| 8,413,493 | B1* | 4/2013 | Polywoda, III | ....... G01M 15/14 73/112.01 |
| 2004/0153815 | A1* | 8/2004 | Volponi | ............. G05B 23/0275 714/37 |

(Continued)

FOREIGN PATENT DOCUMENTS

| EP | 1416348 A1 | 5/2004 |
| EP | 1717659 A1 | 11/2006 |

OTHER PUBLICATIONS

European Search Report for Application No. 15200533.6-1802; dated Mar. 16, 2016; 8 pgs.

*Primary Examiner* — Thomas Ingram
(74) *Attorney, Agent, or Firm* — Cantor Colburn LLP

(57) ABSTRACT

System and methods for detecting anomalies and identifying faults of a gas turbine engine may include a recorder in communication with a processor. The recorder may be configured to capture archival data of the gas turbine engine. A flight normalizer module may be configured to produce normalized results based on the archival data. A flight parameter features module may be configured to generate flight parameter features based on the normalized results. A data warehouse module may be configured to determine suspected fault classes by comparing the flight parameter features against training parameter features stored in the data warehouse module based on queries from the flight parameter features module. A majority vote module may be configured to determine a diagnosed fault class based on the suspected fault classes.

20 Claims, 8 Drawing Sheets

(51) Int. Cl.
  *G06N 99/00*  (2010.01)
  *G06N 5/04*  (2006.01)
  *G05B 23/02*  (2006.01)

(52) U.S. Cl.
  CPC .. *G06F 17/30424* (2013.01); *G06F 17/30592* (2013.01); *G06N 5/047* (2013.01); *G06N 99/005* (2013.01); *G07C 5/0841* (2013.01)

(56) References Cited

U.S. PATENT DOCUMENTS

2006/0235599 A1* 10/2006 Mukherjee ......... G05B 23/0254
  701/100
2012/0016824 A1* 1/2012 Kalinkin ............... G01M 15/14
  706/12

* cited by examiner

GAS TURBINE ENGINE ANOMALY DETECTIONS AND FAULT IDENTIFICATIONS

CROSS REFERENCE TO RELATED APPLICATIONS

This application is a non-provisional application claiming the 35 U.S.C. §119(e) benefit of U.S. Provisional Patent Application No. 62/092,647 filed on Dec. 16, 2014.

TECHNICAL FIELD

The subject matter of the present disclosure relates generally to gas turbine engines and, more particularly, relates to anomaly detections and fault identifications of such gas turbine engines.

BACKGROUND

Many traditional gas turbine engines utilize data, such as aircraft condition monitoring function data, as the primary source of information to support engine diagnostics. The aircraft condition monitoring function data may consist of discrete data values for various internal temperatures, pressures, and spool speeds, to name a few examples. This data may be captured during various flight phases. Most typically, this data is captured during take-off and stable cruise conditions. Generally, the captured data is corrected for flight condition and ambient environment and then compared to a nominal reference, such as a calibrated model, to produce delta quantities that are trended over time. Anomalous engine behavior may be observed from such trending and noted for further analysis.

Because there may be as little as one data point per flight that is trended, however, it may take several flights to detect a truly deviated condition as opposed to statistical outliers or noise. A fine line exists between alerting to a false alarm from detecting too early and waiting too long to alert, which may result in potential engine faults. For example with respect to cruise conditions, the data is typically single averaged data points and the analysis methods utilized are discrete time methods since trending occurs over numerous flights spanning days, months, and years. As such, a certain level of latency is introduced in observing a shift in a parameter (or a set of parameters) with any degree of persistency as it may take several flights, over a period of days or longer, before a shift could be declared confidently without introducing false alarms that may occur from reacting to single time point outliers.

Furthermore, many condition monitoring systems of legacy gas turbine engines are equipped with continuous recorders, such as quick access recorders, which capture archival data at sampling rates of around 1 Hz. Generally, when the trended aircraft conditioning monitoring function data alerts to an anomalous condition, the continuous recorder data may be used in an investigative diagnosis to aid in identifying the anomaly. If an alert is not noted, however, such continuous recorder data may never be reviewed. While generally effective, such traditional fault detection and identification systems and techniques for gas turbine engines incur added latency in identifying anomalous engine behavior due to trending the once per flight data.

SUMMARY

In accordance with an aspect of the disclosure, a system is provided for detecting anomalies and identifying faults of a gas turbine engine. The system may include a recorder in communication with a processor. The recorder may be configured to capture archival data of the gas turbine engine. The system may include a flight normalizer module executed by the processor. The flight normalizer module may be configured to produce normalized results based on the archival data. The system may include a flight parameter features module executed by the processor. The flight parameter features module may be configured to generate flight parameter features based on the normalized results. The system may include a data warehouse module executed by the processor. The data warehouse module may be configured to determine suspected fault classes by comparing the flight parameter features against training parameter features stored in the data warehouse module based on queries from the flight parameter features module. The system may include a majority vote module executed by the processor. The majority vote module may be configured to determine a diagnosed fault class based on the suspected fault classes.

In accordance with another aspect of the disclosure, the training parameter features may be generated by a training system that is in communication with the data warehouse module.

In accordance with still another aspect of the disclosure, the training system may include an engine model driven by an engine control executed by the processor.

In accordance with yet another aspect of the disclosure, the system may include a profile data module executed by the processor. The profile data module may include flight profile data sets and engine condition data sets.

In accordance with still yet another aspect of the disclosure, the system may include a test case generation module executed by the processor and configured to generate a nominal condition engine class by inputting combinations of the flight profile data sets and the engine condition data sets into the engine control.

In accordance with an even further aspect of the disclosure, the test case generation module may be configured to generate a corresponding plurality of fault classes by introducing a plurality of fault conditions into the flight profile data sets.

In further accordance with another aspect of the disclosure, the system may include a training normalizer module executed by the processor and configured to generate training normalized data in response to receiving and normalizing the nominal condition engine class and the corresponding plurality of fault classes.

In further accordance with yet another aspect of the disclosure, the system may include a training parameter features module executed by the processor. The training parameter features module may be configured to generate the training parameter features in response to receiving the training normalized data.

In further accordance with still yet another aspect of the disclosure, the training parameter features and the flight parameter features may be determined by using a discrete cosine transform module.

In further accordance with an even further aspect of the disclosure, the training parameter features and the flight parameter features may be utilized by a weighted kNN nearest neighbor classification module.

In further accordance with still an even further aspect of the disclosure, the recorder may be a continuous recorder.

In accordance with another aspect of the disclosure, a method for detecting anomalies and identifying faults of a gas turbine engine is provided. The method may include receiving archival data of the gas turbine engine from a recorder using a computer processor. The method may include generating normalized archival data using the computer processor. The method may include generating flight parameter features using the computer processor. The method may include determining suspected fault classes by comparing the flight parameter features against training parameter features stored in a data warehouse module using the computer processor. The method may include determining a diagnosed fault class from the suspected fault classes using the computer processor.

In accordance with still another aspect of the disclosure, the method may include determining the flight parameter features and the training parameter features using a discrete cosine transform module.

In accordance with still yet another aspect of the disclosure, the method may include using a weighted kNN nearest neighbor classification module to issue a query of the flight parameter features to the training parameter features.

In accordance with an even further aspect of the disclosure, the training parameter features may be generated from a training system in communication with the data warehouse module using the computer processor.

In accordance with still an even further aspect of the disclosure, the training system may generate a nominal condition engine class and a plurality of fault classes using the computer processor.

In further accordance with yet another aspect of the disclosure, the training system may normalize the nominal condition engine class and the plurality of fault classes to generate training normalized data using the computer processor.

In accordance with another aspect of the disclosure, a non-transitory, computer readable medium having thereon computer-executable instructions for detecting anomalies and identifying faults of a gas turbine engine is provided. The instructions may include instructions for receiving archival data of the gas turbine engine from a recorder. The instructions may include instructions for generating normalized archival data. The instructions may include instructions for generating flight parameter features. The instructions may include instructions for determining suspected fault classes by comparing the flight parameter features against training parameter features stored in a data warehouse module. The instructions may include instructions for determining a diagnosed fault class from the suspected fault classes.

In accordance with yet another aspect of the disclosure, the instructions may include instructions for determining the flight parameter features and the training parameter features using a discrete cosine transform module.

In accordance with still yet another aspect of the disclosure, the instructions may include instructions for using a weighted kNN nearest neighbor classification module to issue a query of the flight parameter features to the training parameter features.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which:

FIG. 4-1 is a 3-dimensional representation of training parameter features stored in the data warehouse module of FIG. 4, in accordance with an embodiment;

FIG. 4-2 is a 3-dimensional representation of a kNN query issued from the weighted kNN nearest neighbor classification module of FIG. 4, in accordance with an embodiment;

FIG. 4-3 is an exemplary diagnostic chart that may be produced from the exemplary system of FIG. 4, in accordance with an embodiment;

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

The present disclosure provides systems and methods for detecting anomalies and identifying faults of a gas turbine engine. Such systems and methods may utilize archival data captured from the gas turbine engine to aid in identifying anomalous engine behavior without incurring the added latency due to trending once per flight data of prior systems and methods.

Throughout this specification the terms "downstream" and "upstream" are used with reference to the general direction of gas flow through the engine and the terms "axial", "radial" and "circumferential" are generally used with respect to the longitudinal central engine axis.

Figure 1:
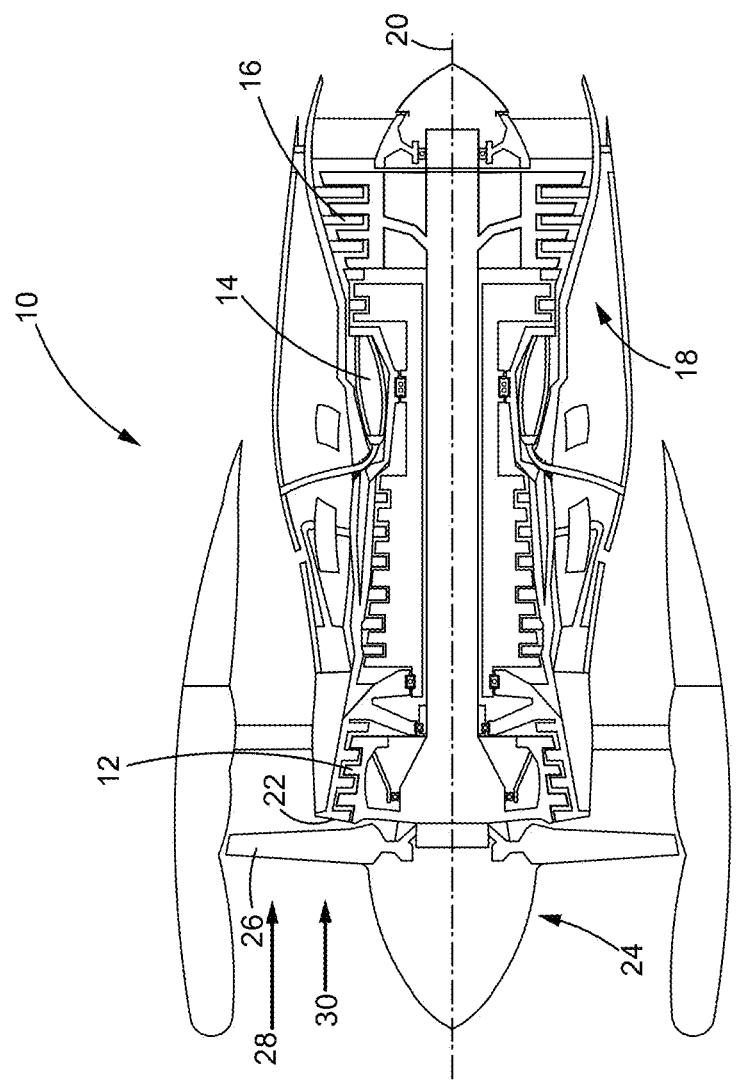
FIG. 1 is a side view of a gas turbine engine with portions sectioned and broken away to show details according to an embodiment.

Referring now to FIG. 1, an exemplary gas turbine engine constructed in accordance with the present disclosure is generally referred to by reference numeral 10. The gas turbine engine 10 includes a compressor section 12, a combustor 14 and a turbine section 16. The combination of the compressor section 12, the combustor 14 and the turbine section 16 is commonly referred to as a core engine 18. The compressor section 12 may include a low pressure compressor and a high pressure compressor. Similarly, the turbine section 16 may include a low pressure turbine and a high pressure turbine. The engine 10 is circumscribed about a longitudinal central axis 20.

Air enters the compressor section 12 at the compressor inlet 22 and is pressurized. The pressurized air then enters the combustor 14. In the combustor 14, the air mixes with jet fuel and is burned, generating hot combustion gases that flow downstream to the turbine section 16. The turbine section 16 extracts energy from the hot combustion gases to drive the compressor section 12 and a fan 24, which includes a plurality of airfoils 26 (two airfoils shown in FIG. 1). As the turbine section 16 drives the fan 24, the airfoils 26 rotate so as to take in more ambient air. This process accelerates the ambient air 28 to provide the majority of the useful thrust produced by the engine 10. Generally, in some modern gas turbine engines, the fan 24 has a much greater diameter than the core engine 18. Because of this, the ambient air flow 28 through the fan 24 can be 5-10 times higher, or more, than the core air flow 30 through the core engine 18. The ratio of flow through the fan 24 relative to flow through the core engine 18 is known as the bypass ratio. It should be noted that the gas turbine engine 10 is an exemplary gas turbine engine and that other gas turbine engines are within the scope of this disclosure and the appended claims, including, without limitation, those gas turbine engines with low or no bypass airflow.

Figure 2:
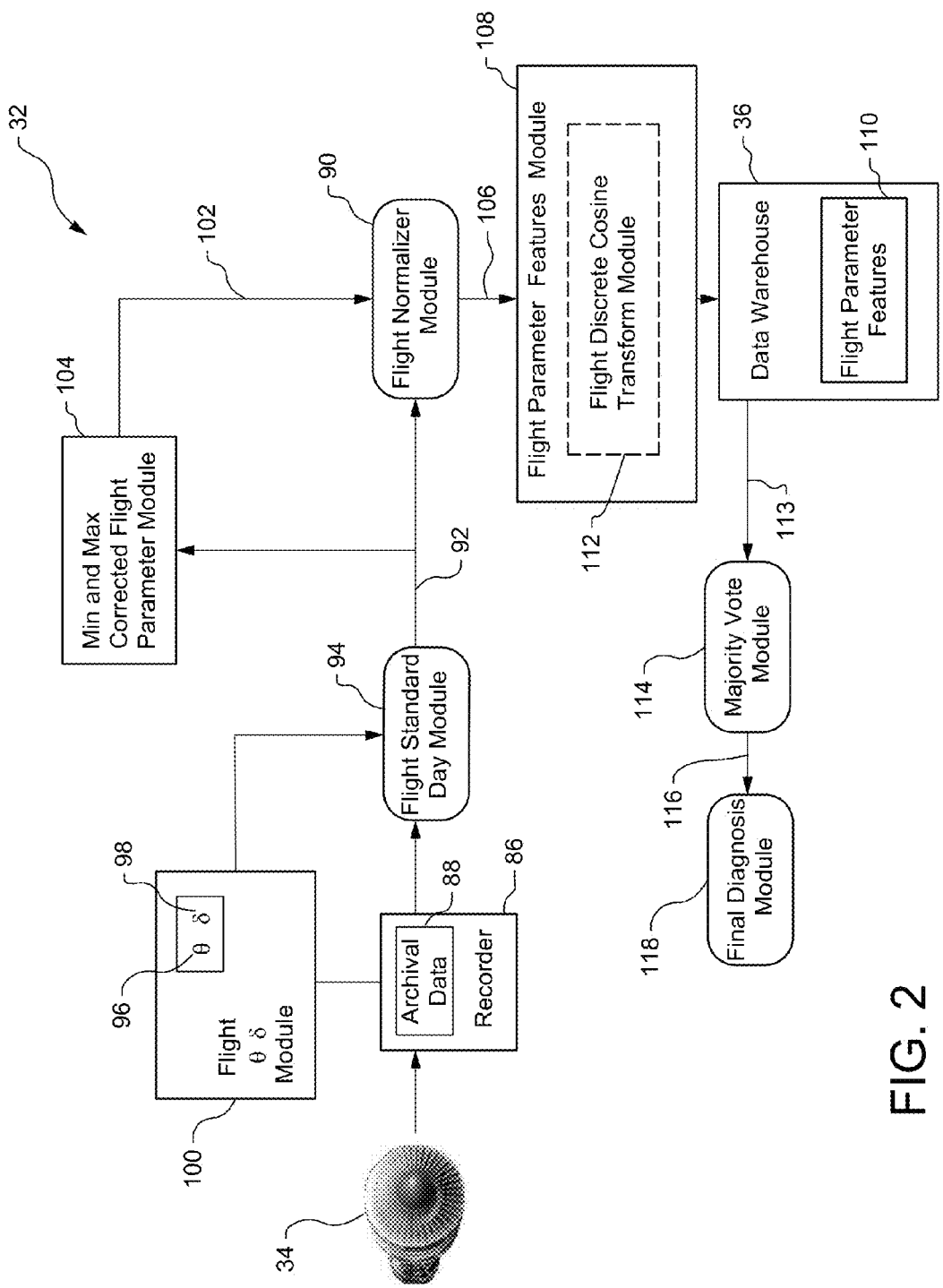
FIG. 2 is a schematic diagram of an exemplary system for gas turbine engine anomaly detection and fault identification in accordance with an embodiment.
Figure 3:
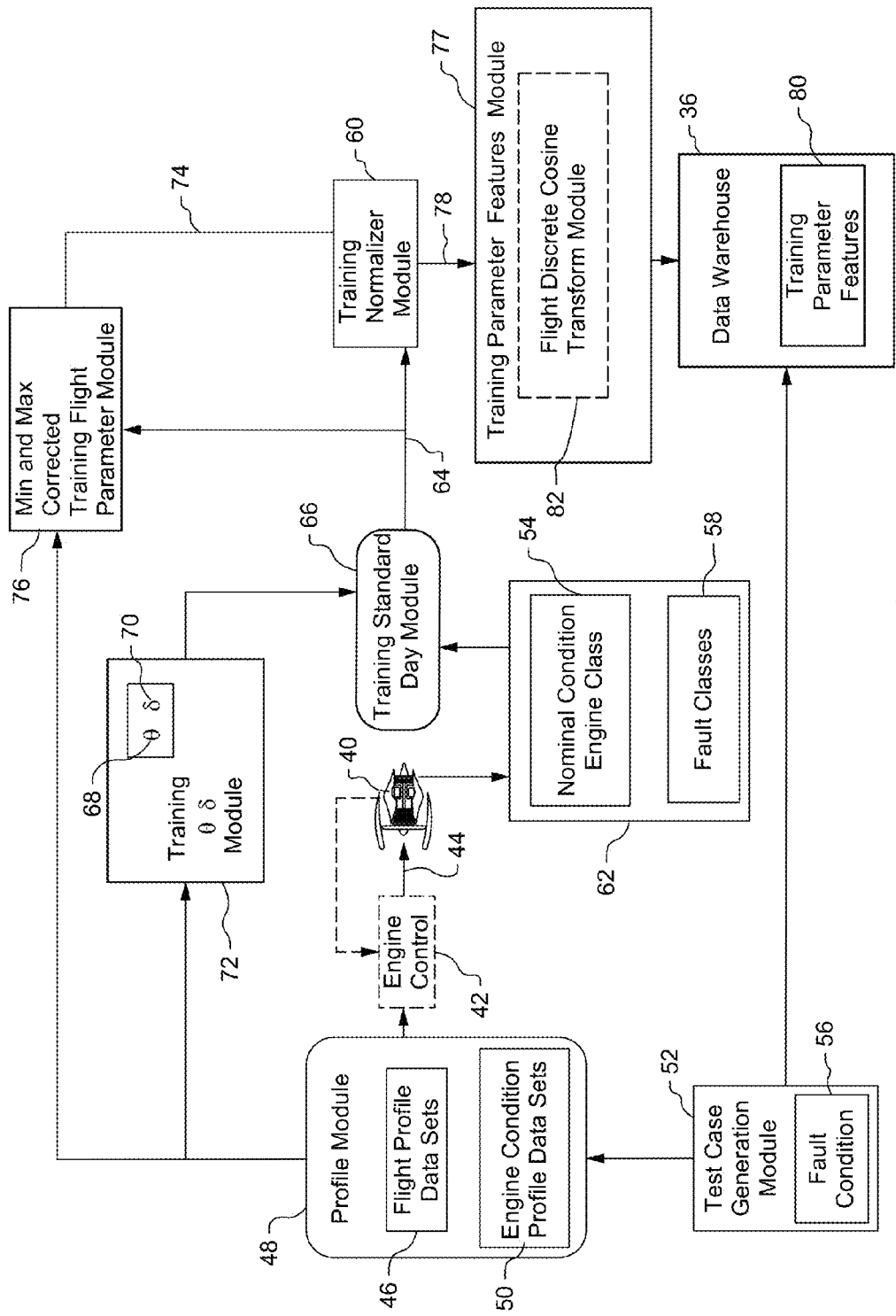
FIG. 3 is a schematic diagram of an exemplary training system in accordance with an embodiment.

Turing now to FIG. 2, an exemplary detection and identifying system for detecting anomalies and identifying faults of a gas turbine engine is generally referred to by reference numeral 32. The system 32 may include a gas turbine engine 34 that is similar to the gas turbine engine 10 described above. The system 32 may include a data warehouse module 36, which is associated with a training system 38, as illustrated in FIG. 3. As an example, the data warehouse module 36 may be part of an aircraft communications addressing and reporting system located at a ground station. The training system 38 is a closed-loop simulation of a gas turbine engine model 40 that is similar to the gas turbine engines 10, 34. The engine model 40 may be driven by an engine control 42 that translates pilot commands such as, but not limited to, power level angle (PLA) to engine inputs 44 across a myriad of flight conditions such as, but not limited to, altitude, mach number, and ambient temperature.

The engine control 42 may receive a series of flight profile data sets 46 from a profile module 48. As non-limiting examples, the flight profile data sets 46 may include power level angle, altitude, mach, total air temperature, or equivalent parameters that may be used by the engine control 42. The flight profile data sets 46 may be hypothetical data or real data that may be acquired, for example, from flight operations and quality assurance data. The profile module 48 may also include engine condition profile data sets 50, which also may be received by the engine control 42.

A test case generator module 52 may generate various model engine 40 simulation performances by choosing a flight profile data set from the flight profile data sets 46 to be input to the engine control 42 and choosing an engine condition profile data set from the engine condition profile data sets 50 to be input to the engine control 42. The test case generator module 52 may choose various combinations from the flight profile data sets 46 and the engine condition profile data sets 50 to model a nominal condition engine class 54, which, after being normalized, may eventually be received and stored in the data warehouse module 36. The nominal condition engine class 54 may represent a series of randomly distributed engine component performance levels that cover the expected level of engine-to-engine production or overhaul variation.

Moreover, the test case generator module 52 may also randomly introduce a plurality of fault conditions 56 into the flight profile data sets 46, at both steady state (e.g. cruise) and transient (e.g. takeoff) conditions, to modify the nominal condition engine class 54 and produce a plurality of fault classes 58, which, after being normalized, may eventually be received and stored in the data warehouse module 36. The plurality of fault conditions 56 may include engine module performance faults such as, but not limited to, efficiency and flow capacity level changes in the fan 24, the low and high pressure compressors 12, and the low and high pressure turbines 16, as well as control and accessory faults such as, but not limited to, bleed leak failures, active clearance control failures, variable vane actuation faults, and sensor bias and drifts.

The training system 38 may also include a training normalizer module 60 which normalizes the flight profile data sets 46 and the plurality of fault conditions 56 that are input into the engine control 42 as well as the output data 62 consisting of the nominal condition engine class 54 and the plurality of fault classes 58 generated from corresponding simulations. The training normalizer module 60 receives the standard day corrected training parameters 64 calculated from the training standard day module 66. The training standard day module 66 receives and calculates the output data 62 as well as the training θ output 68 and the training δ output 70 received from the training θ/δ module 72. The training θ output 68 and the training δ output 70 are calculated from the flight profile data sets 46 and the plurality of fault conditions 56 that are input into the engine control 42 by applying the following relationships:

$$\theta = \frac{T_{inlet}}{T_{reference}},$$

where $T_{inlet}$ is engine inlet total temperature (or airframe Total Air Temperature (TAT), if the former is not available) in absolute temperature units, i.e., either degrees Rankine or degrees Kelvin, and $T_{reference}$ is an International Standard Atmosphere (ISA) reference condition, for example sea level static at 518.67 degrees Rankine or 273.15 degrees Kelvin.

Likewise, $$\delta = \frac{P_{inlet}}{P_{reference}},$$

where $P_{inlet}$ is engine inlet total pressure (or estimated inlet total pressure calculated from aircraft ambient pressure and Mach number data, if the former is not available) in absolute pressure units, e.g., psia, and $P_{reference}$ is an International Standard Atmosphere (ISA) reference condition, for example, sea level static at 14.696 psia.

These calculations are made at each time step in the data stream and the subsequent θ and δ values are applied to each engine output parameter of interest, P, by performing the following calculation:

$$P_{corrected} = \frac{P}{\theta^a \delta^b},$$

where a and b are pre-defined exponents. The parameter(s), P, are generally chosen to be, but not limited to, the typical gas path parameters measured on most commercial and military gas turbines, e.g., fuel flow, rotor speeds, inter-stage pressures and temperature, to name a few examples.

The training normalizer module 60 also receives minimum and maximum corrected training flight parameter output 74 from the minimum and maximum corrected training flight parameter module 76. The minimum and maximum corrected training flight parameter module 76 determines the minimum and maximum corrected training flight parameter output 74 by calculating the training standard day corrected parameters 64 and the flight profile data sets 46 and plurality of fault conditions 56 that are input into the engine control 42. The minimum and maximum for each corrected parameter across the training data set is calculated from nominal engine simulations in order to normalize the data. For this reason, the training data may include both low power data (for example, Ground Idle) and high power operation data (for example, maximum Take-off power). The training normalizer module 60 normalizes the training standard day corrected parameters 64 with the minimum and maximum corrected training flight parameter output 74 to produce training normalized data 78. The corrected parameter outputs 64, 74 may be transformed to a fixed uniform scale, for example, 0 to 100, by associating the minimum value with 0 and the maximum value with 100. Intermediate values may be transformed in a variety of ways, one of which could be a linear transformation such as $$P_{corrected}^{(Normalized)} = \frac{100}{P_{corrected}^{(MAX)} - P_{corrected}^{(MIN)}}(P_{corrected} - P_{corrected}^{(MIN)}).$$

A training parameter features module 77 may receive the training normalized data 78 from the training normalizer module 60. The training parameter features module 77 processes the training normalized data 78 to produce training parameter features 80, which may be received by the data warehouse module 36. The training parameter features 80 may aid in differentiating between the nominal condition engine class 54 and the plurality of fault classes 58 at both steady state and transient conditions. In particular, the training parameter features module 77 may determine the training parameter features 80 by various modules such as, but not limited to, a training discrete cosine transform module 82 and a training weighted kNN nearest neighbor classification module 84, as described below.

Discrete Cosine Transform

The discrete cosine transform is a mathematical tool for the linear transformation of functions, and is a member of the generalized family of Fourier transforms. In general, Fourier transforms seek to represent a series of input data as a sum of fundamental functions of different orders of magnitude in order to express the input data in an alternative representation. In the context of this application, such a transform is applied in several fundamental steps for the purposes of expressing the underlying data in a different domain, and is characterized by (a) the mathematical formula for the transformation function, (b) the window length, and (c) the overlap length/size:

(1) The input data is windowed, meaning that a finite subset of a potentially infinite series of input data is packaged for transformation as a data vector (for computational convenience, the lengths of these windows are usually powers of 2).

(2) The transformation function is applied to a windowed vector of original data, yielding a corresponding vector (of equal length) in the transform domain, usually referred to as "transform coefficients" (in the case of the discrete cosine transform, the new data is called "DCT coefficients").

(3) A new, subsequent subset of data is windowed for transformation. In practice, there is usually an overlap between the latter data points in a previous input vector and the current input data vector, allowing for a finer continuity in the transform domain vector coefficients.

In practice and implementation, the window and overlap parameters are designed with hardware and software constraints as well as theoretical design limitations in mind. The purpose of these mathematical transformations is the extraction of information more relevant to a particular goal; in this case, the goal is for the transform coefficients to be a more compact and sensitive description of the original data. Compactness is important in order to make subsequent algorithmic decisions efficiently, and is often characterized by a truncation of the transform coefficient vector while including terms corresponding to lower orders of magnitude (ex: a 16-sample window yields a length 16 DCT coefficient vector, which is then truncated to include only the first 8 of these coefficients). Sensitivity is important in the ability of subsequent algorithmic decisions to differentiate between a variety of changes that may be present but difficult to otherwise detect within the original data. Sensitivity is adjusted to different factors with appropriate transform and parameter selection.

A data transformation of this sort is the first step in a feature extraction and classification process. The transform is used as an extraction method for more efficient and representative set of inputs for the classifier—another mathematical tool that is used to discern between different varieties, or classes, of data (in our case, nominal and several classes of fault data). A classifier can be defined mathematically in a variety of ways (a closed-form expression, a series of numerical calculations, or a parameterized model), but includes "training" phases (i.e. as utilized in the training system 38) and "testing" phases (i.e. as utilized more particularly in system 32 described in more detail below). The training phase defines a particular instance of the classifier with the input of sample data from all of the input classes of interest with the goal of producing decision-making rules for that input set. A trained classifier may not correctly identify all of the classes for each data point from the input set, but attempts to perform this task to the optimal possible level based on particular criteria (for example, minimizing the number of false positives). In the testing phase, a trained classifier is fed non-training input data and utilizes the training-defined decision-making rules in order to specify class affiliation.

In many multi-class problems, an additional design decision involves the distinction between (a) formulating a single, complex classifier that can discern between all possible classes of data and (b) formulating several binary classifiers that decide between one and all other classes, and subsequently combining the decisions of these separate classifiers into an overall decision for a particular data point. The latter approach, often referred to as decision fusion, is generally characterized by a second layer classifier that takes binary classification decisions as inputs and produces a single, combined output.

As an example, a Support Vector Machine (SVM) may be implemented as the classifier based on a variety of factors (training time, classification accuracy, ease of implementation), but other classifiers may also be implemented for this purpose. A decision-fusion approach to the multi-class problem may be utilized, for example, to provide efficient runtimes and yield improved overall decision results.

The training parameter features 80 stored in the data warehouse module 36 may be referenced during operation of the gas turbine engine 34 in the detection and identification system 32, as illustrated in FIG. 2. The detection and identification system 32 illustrates the monitoring of the gas turbine engine 34 during flight. The detection and identification system 32 may include a recorder 86 such as, but not limited to, a quick access recorder (continuous recorder). The recorder 86 may capture archival data 88 such as, but not limited to, internal temperature, pressure, spool speeds, and other data during operation (e.g. full flight) of the gas turbine engine 34. The archival data 88 may be captured at sampling rates of 1-10 Hz or greater.

The detection and identification system 32 of FIG. 2 may also include a flight normalizer module 90 which normalizes the archival data 88 from the continuous recorder 86. The flight normalizer module 90 receives the standard day corrected flight parameters 92 calculated from the flight standard day module 94. The flight standard day module 94 receives and calculates the archival data 88 as well as the flight $\theta$ output 96 and the flight $\delta$ output 98 received from the flight $\theta/\delta$ module 100. The flight $\theta$ output 96 and the flight $\delta$ output 98 are calculated from the archival data 88 in a similar manner as the calculation of the training $\theta$ output 68 and the training $\delta$ output 70 as described above. The flight normalizer module 90 also receives minimum and maximum corrected flight parameter output 102 from the minimum and maximum corrected flight parameter module 104. The minimum and maximum corrected flight parameter module 104 determines the minimum and maximum corrected flight parameter output 102 by calculating the standard day corrected flight parameters 92. The minimum and maximum values used may be the expected minimum and maximum values for a standard day corrected parameter for the monitored engine 34 for each parameter measured for a nominal engine. This could, for example, be the same values used in the training system 38 described above. The flight normalizer module 90 normalizes the standard day corrected flight parameters 92 with the minimum and maximum corrected flight parameter output 102, in a similar manner as described above in regards to the training normalizer module 60, to produce normalized archival data 106.

A flight parameter features module 108 may receive the normalized archival data 106 from the flight normalizer module 90. The flight parameter features module 108 processes the normalized archival data 106 to produce flight parameter features 110, which may initiate a query to the data warehouse module 36 to determine against the training parameter features 80 whether the flight parameter features 110 are classified as a nominal condition engine class 54 or one of the plurality of fault classes 58. The flight parameter features module 108 may determine the flight parameter features 110 using one or more modules such as, but not limited to, a flight discrete cosine transform module 112. When a flight parameter feature 110 is classified as one of the plurality of fault classes 58 a suspected fault class output 113 is generated and sent to a majority vote module 114. The majority vote module 114 analyzes each of the suspected fault class outputs 113 collectively for each particular fault class 58 and identifies a diagnosed fault class 116 when it is determined that the suspected fault class outputs 113 are a particular fault class 58 a number of times above a particular threshold. A final diagnosis module 118 receives each diagnosed fault class 116 and alerts to the fault.

Weighted kNN Nearest Neighbor Classification

Figure 4:
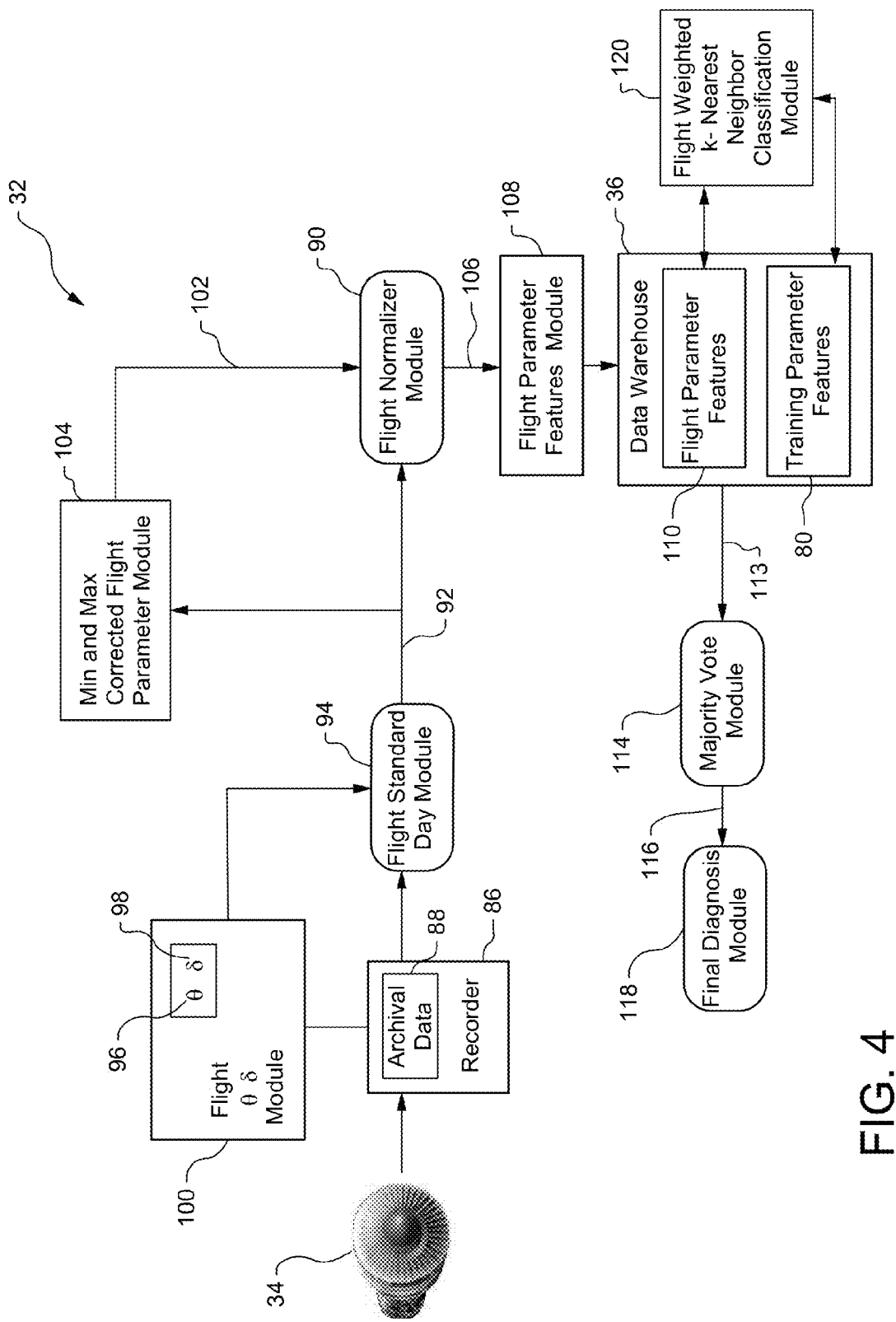
FIG. 4 is a schematic diagram of an alternative embodiment of the exemplary system of FIG. 2 in accordance with an embodiment.
Figures 2, 4:
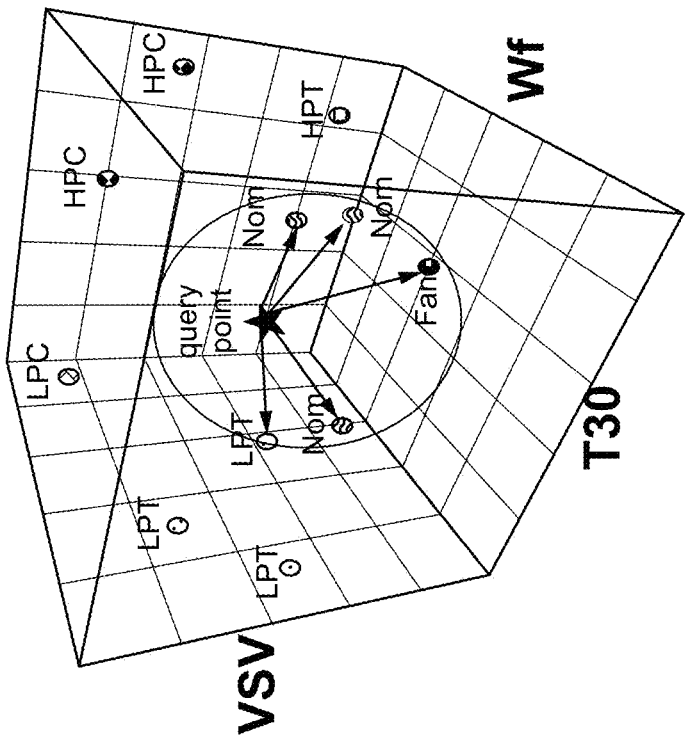
Figures 1, 4:
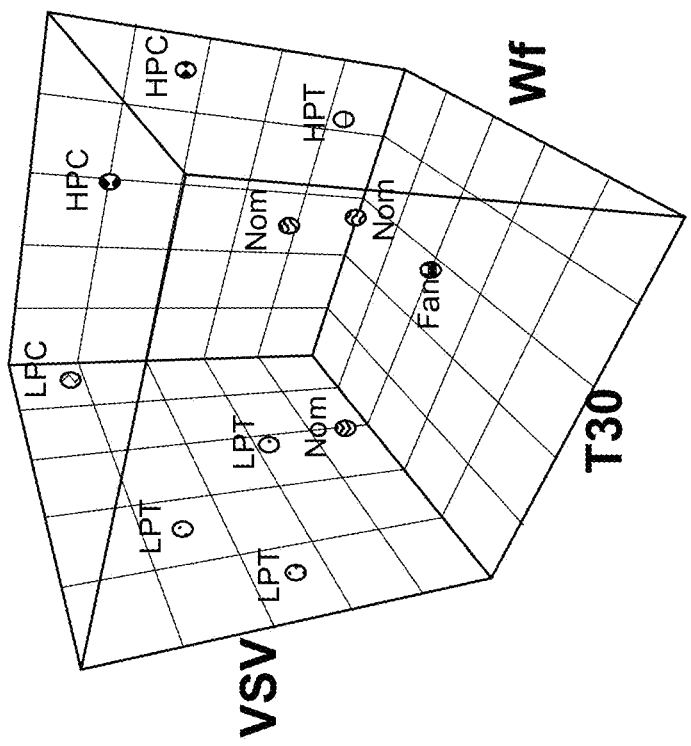
Figures 3, 4:
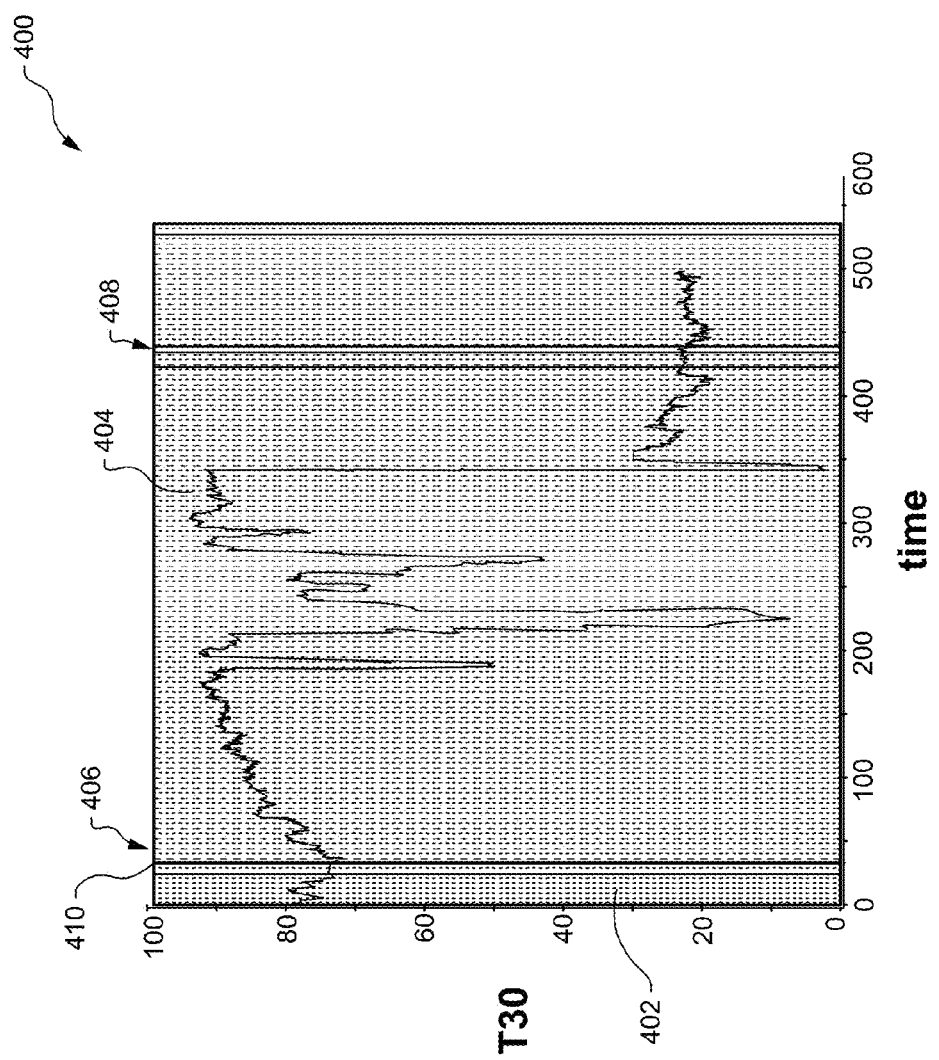

In an alternative embodiment of system 32 without the discrete cosine transform modules 82, 112, as illustrated in FIG. 4, according to an embodiment, a weighted kNN nearest neighbor classification module 120 may be utilized. With the weighted kNN nearest neighbor classification approach, the focus is on finding relationships between selected engine parameter inputs and outputs stored in the data warehouse module 36. For example, 2 inputs such as, but not limited to, Fuel Flow (Wf) and Compressor Variable Stator Vane angle (VSV) may be selected and 7 outputs such as, but not limited to, Core Rotor Speed (Nc), Fan Rotor Speed (Nf), High Pressure Compressor inlet temperature and pressure (T24, P24), High Pressure Compressor exit static pressure (Ps30), and High Pressure Turbine exit temperature and pressure (T48, P48) may be selected. Such input-output parameters may be regarded as a 9-dimensional point representing the input-output relationship at a certain sampled point. Such 9-dimensional points generated from the training system 38 may be stored in the training parameter features 80, as a spatial index structure, in the data warehouse module 36.

For ease of understanding, an example is illustrated in 3-dimensional space as depicted in FIG. 4-1. Without loss of generality, FIG. 4-1 illustrates the case of the (Wf, VSV)-(T30) relationship in a 3-dimensional space. Each point in FIG. 4-1 includes metadata such as, but not limited to, fault condition, flight environment information etc. It should be noted that the metadata does not need to include the sampled time of each point.

With the 9-dimensional points stored in the training parameter features 80 in the data warehouse 36, the weighted kNN nearest neighbor classification module 120 issues a query of the flight parameter features 110 to the training parameter features 80 for each point in a query full flight. For example, FIG. 4-2 illustrates an example of a kNN query where k=5. In this example, the given query point would be diagnosed as a nominal condition since 3 points of 5 nearest neighbors are nominal condition.

Such kNN queries are issued at each point in a query full flight so that each diagnosis of a given query point is passed to the majority vote module 114. An exemplary diagnostic chart 400, as illustrated in FIG. 4-3, may be produced by the final diagnosis module 118. Specifically, a kNN query may be issued at each sampled data point in a full flight to the data warehouse module 36 so that the majority vote module 114 may decide the fault type at that point by majority voting among kNN nearest neighbors. Each result may be represented as a short or long dashed line at a corresponding time. For example, the results of the sampled data points from 0 to about 300 are depicted as short dashed lines 402 meaning nominal condition. Similarly, the results from about 300 to about 5,800 are drawn as long dashed lines 404, which means LPT fault condition. The dashed lines 402, 404 in exemplary diagnostic chart 400 represent results from approximately 5,800 kNN queries. It should be noted that first sold lines 406 (i.e. LPC fault) at around time of 250 and second solid lines 408 (i.e, FAN fault) around time of 4,600 mean that the results are not consistent with other results. However, these misdiagnosed points can be negligible in the process of majority voting for the final diagnosis.

One of the advantages this approach is that it is not only able to diagnose the fault type, but also to estimate the fault time. With the kNN nearest neighbor approach, the fault time may be estimated by detecting the start time when a certain fault type (not nominal condition) occurs and lasts for a certain period of time. For example, exemplary diagnostic chart 400 depicts an estimated fault time 410 at first solid lines 406 as being identical to an actual fault time.

Figure 5:
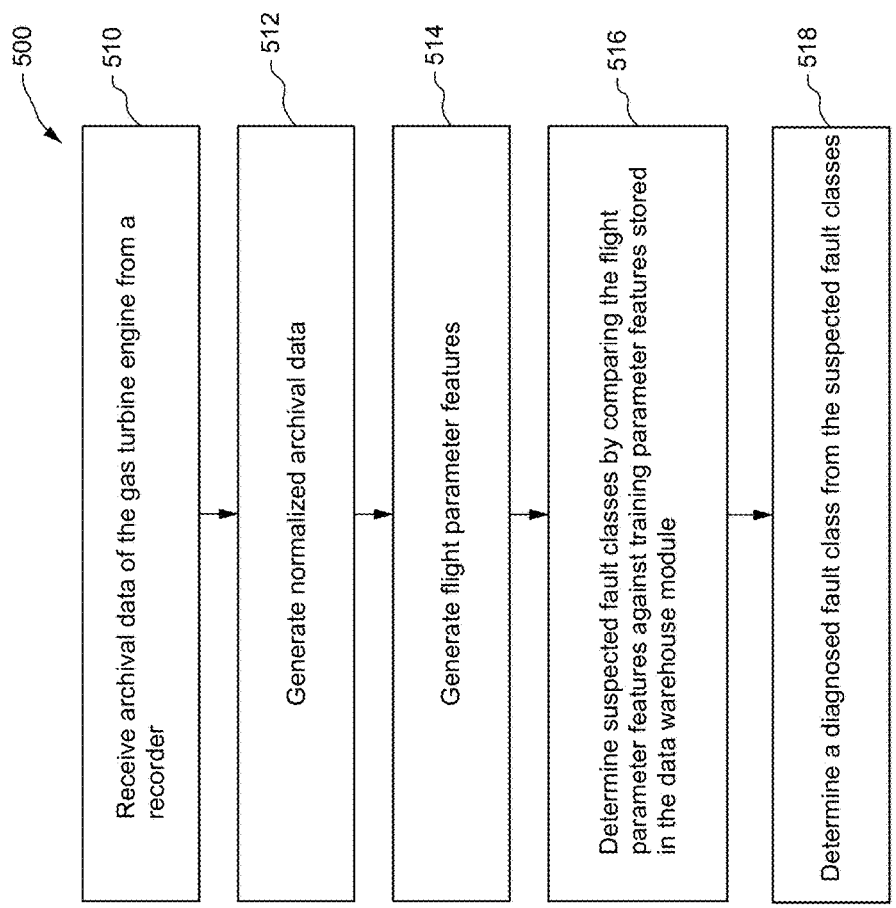
FIG. 5 is a flowchart illustrating a sample sequence of steps which may be practiced in accordance with an embodiment.

FIG. 5 illustrates a flowchart 500 of a sample sequence of steps which may be performed to detect anomalies and identify faults of a gas turbine engine within a single flight, according to an embodiment. The sample sequence of steps may be performed using the system 32 of FIG. 2.

Starting at block 510, a recorder 86 may receive archival data 88 from the gas turbine engine 34. The archival data 88 may be captured by the recorder 86 at sampling rates of 1-10 Hz or greater. The archival data 88 gives visibility to the various phases of flight including cruise and takeoff conditions in order to provide enough data within the same flight to determine persistency when a faulty behavior is noted in the flight parameter features 110. Block 512 illustrates normalizing the archival data 88 to generate normalized archival data 106. Another step, as shown in block 514, is processing the normalized archival data 106 to generate flight parameter features 110. The flight parameter features 110 may be generated using a discrete cosine transform module 82 or other known methods. Yet another step, illustrated in block 516, is performing queries of the flight parameter features 110 to the data warehouse module 36 to determine suspected fault classes 113 by comparing the flight parameter features 110 against training parameter features 80 that are stored in the data warehouse module 36. The queries may be performed using a weighted kNN nearest neighbor classification module 120. The training parameter features 80 may be generated by a training system 38. The training system 38 may generate and normalize the nominal engine class 54 and the plurality of fault classes 58 to generate training normalized data 78. The training normalized data 78 may be processed to generate the training parameter features 110. As shown in block 518, a diagnosed fault class 116 may be determined from the suspected fault classes 113.

Figure 6:
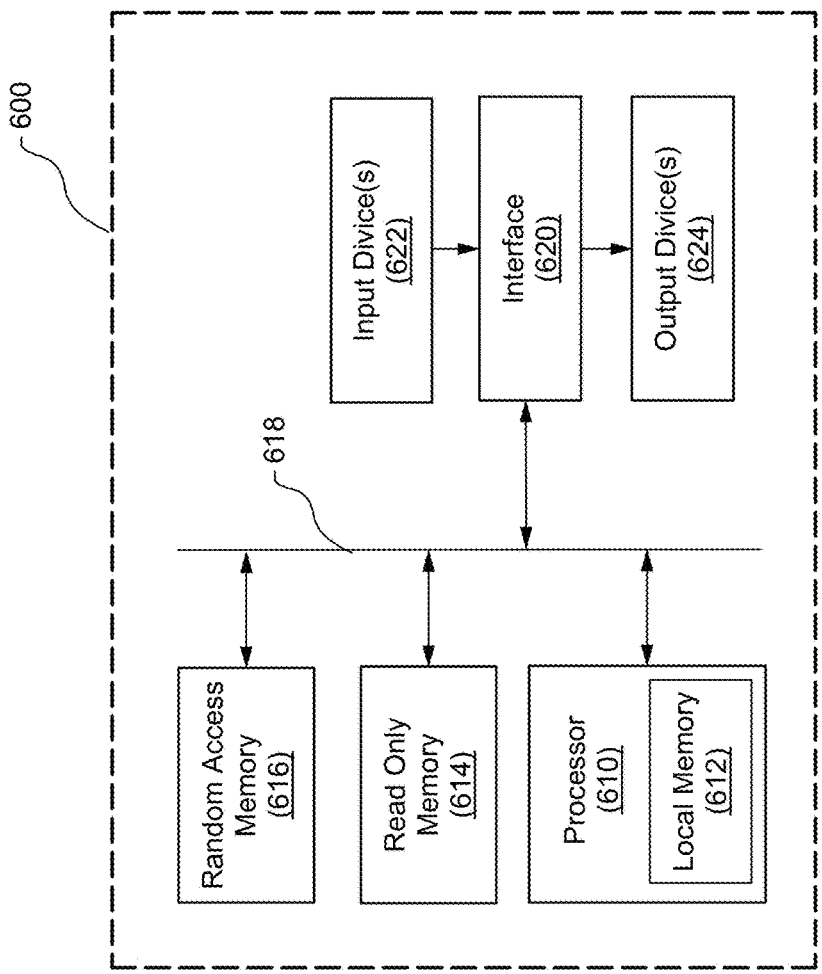
FIG. 6 is a schematic diagram of an example computer that may execute instructions for providing the example systems and methods according to an embodiment.

FIG. 6 is a block diagram of an example computer 600 capable of executing the systems and methods of the present disclosure, according to an embodiment. The computer 600 can be, for example, a server, a personal computer, or any other type of computing device.

The computer 600 may include a processor 610. For example, the processor 610 can be implemented by one or more microprocessors or controllers from any desired family or manufacturer.

The processor 610 includes a local memory 612 and is in communication with a main memory including a read only memory 614 and a random access memory 616 via a bus 618. The random access memory 616 may be implemented by Synchronous Dynamic Random Access Memory (SDRAM), Dynamic Random Access Memory (DRAM), RAMBUS Dynamic Random Access Memory (RDRM) and/or any other type of random access memory device. The read only memory 614 may be implemented by a hard drive, flash memory and/or any other desired type of memory device.

The computer 600 also includes an interface circuit 620. The interface circuit 620 may be implemented by any type of interface standard, such as, for example, an Ethernet interface, a universal serial bus (USB), and/or a PCI express interface, or other interface including a custom interface. One or more input devices 622 are connected to the interface circuit 620. The input device(s) 622 permit a user to enter data and commands into the processor 610. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented by, for example, display devices for associated data (e.g., a liquid crystal display, a cathode ray tube display (CRT), etc.).

The computer 600 may be used to execute machine readable instructions. For example, the computer 600 may execute machine readable instructions to perform the sample sequence of steps illustrated in flowchart 500 of FIG. 5. In such examples, the machine readable instructions comprise a program for execution by a processor such as the processor 610 shown in the example computer 600. The program may be embodied in software stored on a tangible computer readable medium such as a CD-ROM, a floppy disk, a hard drive, a digital versatile disk (DVD), a Blu-ray disk, or a memory associated with the processor 610, but the entire program and/or parts thereof could alternatively be executed by a device other than the processor 510 and/or embodied in firmware or dedicated hardware. Further, although the example programs are described with reference to the flowchart 500 illustrated in FIG. 5, many other methods of implementing embodiments of the present disclosure may alternatively be used. For example, the order of execution of the blocks may be changed, and/or some of the blocks described may be changed, eliminated, or combined. In addition, although reference has been made to numerous individual modules, it will be understood that one or more of the modules may be implemented using a single code, processing circuit, or combination of the two. Furthermore, in some embodiments, all modules may be combined into a single module, either loaded on a single computer or in a distributed computing environment.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth systems and methods for detecting anomalies and identifying faults of a gas turbine engine. The teachings of this disclosure can be employed to utilize archival data from a recorder to aid in detecting and identifying anomalous gas turbine engine behavior without incurring the added latency introduced by trending once per flight data as done traditionally. Moreover, through the novel teachings set forth above, detecting anomalies and identifying faults of the gas turbine engine are accomplished simultaneously. Furthermore, the present disclosure supports ground-based processing of commercial revenue data to determine engine condition to support line maintenance decisions, dispatching decisions, and fleet management programs.

What is claimed is:

1. A system for detecting anomalies and identifying faults of a gas turbine engine, the system comprising:
a processor;
a recorder in communication with the processor, capturing from the gas turbine engine, by continuously sampling during operation of the gas turbine engine, data including one or more of internal temperature (T), pressure (P), and spool speeds;

a flight normalizer module executed by the processor, producing normalized results based on the data by calculating $$\theta = T_{inlet}/T_{reference},$$

$$\delta = P_{inlet}/P_{reference},$$

$$P_{corrected} = P/(\theta^a \delta^b)$$

$$P_{corrected\ Normalized} = (100/(P_{corrected\ MAX} - P_{corrected\ MIN}))*(P_{corrected} - P_{corrected\ MIN}),\ \text{and}$$

wherein minimum and maximum values are expected minimum and maximum values for a nominal engine, calculated from engine simulations;

one of a weighted nearest neighbor (kNN) classification module executed by the processor or a flight parameter features module executed by the processor;

the weighted nearest neighbor (kNN) classification module executed by the processor performs a weighted nearest neighbor classification analysis, which finds mathematical relationships between n selected engine input parameters and m selected engine output parameters, by forming an n+m dimensional spatial index structure representing the input-output relationship at a sampled point, representing each time step in the stream of captured data, and evaluating resulting spatial relationships, and wherein queries to the weighted nearest neighbor (kNN) classification module of the different points identifies whether the query points indicate normal or fault conditions, and, if a fault condition, an estimated time period for the fault;

the flight parameter features module executed by the processor generates flight parameter features based on the normalized results, by using a discrete cosine transform performed by a discrete cosine transform module or the weighted nearest neighbor (kNN) analysis performed by the weighted nearest neighbor classification module, to classify normalized data as nominal or type of fault;

a profile data module in communication with the processor, communicating nominal flight profile data sets, which include one or more of power level angle, altitude, mach, total air temperature used by an engine control, and engine condition data sets;

a test case generation module executed by the processor, generating a nominal condition engine class, representing a series of randomly distributed engine component performance levels that cover the expected level of engine-to-engine production or overhaul variation, by inputting combinations of the flight profile data sets, and the engine condition data sets into the engine control, and a corresponding plurality of fault classes by introducing a plurality of fault conditions into the flight profile data sets, a training normalizer module executed by the processor, generating training normalized data in response to receiving and normalizing the nominal condition engine class, and the corresponding plurality of fault classes;

a training parameter features module executed by the processor, generating the training parameter features for distinguishing between normal conditions and fault classes in response to receiving the training normalized data, by using the discrete cosine transform performed by the discrete cosine transform module or the weighted nearest neighbor (kNN) analysis performed by the weighted nearest neighbor classification module;

a data warehouse module executed by the processor, determining suspected fault classes by comparing the flight parameter features against the training parameter features stored in the data warehouse module based on queries from the flight parameter features module, the queries performed using the weighted kNN nearest neighbor classification module; and a majority vote module executed by the processor, determining a diagnosed fault class based on the suspected fault classes, by determining that the suspected fault class outputs correspond to a particular fault class a number of times above a particular threshold.

2. The system of claim 1, wherein the training parameter features are generated by a training system that is in communication with the data warehouse module.

3. The system of claim 2, wherein the training system includes an engine model driven by an engine control executed by the processor.

4. The system of claim 3, further including a profile data module executed by the processor, the profile data module includes flight profile data sets and engine condition data sets.

5. The system of claim 4, further including a test case generation module executed by the processor and configured to generate a nominal condition engine class by inputting combinations of the flight profile data sets and the engine condition data sets into the engine control.

6. The system of claim 5, wherein the test case generation module is configured to generate a corresponding plurality of fault classes by introducing a plurality of fault conditions into the flight profile data sets.

7. The system of claim 6, further including a training normalizer module executed by the processor and configured to generate training normalized data in response to receiving and normalizing the nominal condition engine class and the corresponding plurality of fault classes.

8. The system of claim 7, further including a training parameter features module executed by the processor, the training parameter features module configured to generate the training parameter features in response to receiving the training normalized data.

9. The system of claim 1, wherein the recorder is a continuous recorder.

10. The system of claim 1, wherein the training parameter features and the flight parameter features are determined by using a discrete cosine transform module.

11. The system of claim 1, wherein the training parameter features and the flight parameter features are utilized by a weighted kNN nearest neighbor classification module.

12. A method for detecting anomalies and identifying faults of a gas turbine engine using the system of claim 1, the method comprising:

receiving data of the gas turbine engine from the recorder using a computer processor;

generating normalized data using the computer processor;

generating flight parameter features using the computer processor;

determining suspected fault classes by comparing the flight parameter features against training parameter features stored in a data warehouse module using the computer processor; and determining a diagnosed fault class from the suspected fault classes using the computer processor.

13. The method of claim 11, further including:
determining the flight parameter features and the training parameter features using a discrete cosine transform module.

14. The method of claim 12, further including
using a weighted kNN nearest neighbor classification module to issue a query of the flight parameter features to the training parameter features.

15. The method of claim 12, wherein
the training parameter features are generated from a training system in communication with the data warehouse module using the computer processor.

16. The method of claim 15, wherein
the training system generates a nominal condition engine class and a plurality of fault classes using the computer processor.

17. The method of claim 15, wherein
the training system normalizes the nominal condition engine class and the plurality of fault classes to generate training normalized data using the computer processor.

18. A non-transitory, computer readable medium having thereon computer-executable instructions for detecting anomalies and identifying faults of a gas turbine engine with the system of claim 1, the instructions comprising:
instructions for receiving data of the gas turbine engine from a recorder;
instructions for generating normalized data;
instructions for generating flight parameter features;
instructions for determining suspected fault classes by comparing the flight parameter features against training parameter features stored in a data warehouse module; and
instructions for determining a diagnosed fault class from the suspected fault classes.

19. The non-transitory, computer readable medium having thereon computer-executable instructions of claim 18,
wherein the instructions further comprise instructions for determining the flight parameter features and the training parameter features using a discrete cosine transform module.

20. The non-transitory, computer readable medium having thereon computer-executable instructions of claim 18,
wherein the instructions further comprise instructions for using a weighted kNN nearest neighbor classification module to issue a query of the flight parameter features to the training parameter features.

* * * * *